United States Patent
Imaizumi et al.

(10) Patent No.: US 9,958,263 B2
(45) Date of Patent: May 1, 2018

(54) CORRECTION DEVICE AND CORRECTION METHOD FOR OPTICAL MEASURING APPARATUS

(71) Applicant: MITUTOYO CORPORATION, Kanagawa (JP)

(72) Inventors: Ryoichi Imaizumi, Kanagawa (JP); Ichiro Taniguchi, Kanagawa (JP)

(73) Assignee: MITUTOYO CORPORATION, Kanagawa (JP)

(*) Notice: Subject to any disclaimer, the term of this patent is extended or adjusted under 35 U.S.C. 154(b) by 253 days.

(21) Appl. No.: 14/668,171

(22) Filed: Mar. 25, 2015

(65) Prior Publication Data

US 2015/0276390 A1    Oct. 1, 2015

(30) Foreign Application Priority Data

Mar. 28, 2014 (JP) .................................. 2014-068612

(51) Int. Cl.
    *G01B 11/08*    (2006.01)
    *G01B 11/24*    (2006.01)
    *G01B 11/25*    (2006.01)

(52) U.S. Cl.
    CPC .......... *G01B 11/2504* (2013.01); *G01B 11/08* (2013.01); *G01B 11/2433* (2013.01); *G01B 11/2518* (2013.01)

(58) Field of Classification Search
    None
    See application file for complete search history.

(56) References Cited

U.S. PATENT DOCUMENTS

| | | | | |
|---|---|---|---|---|
| 685,455 A | * | 10/1901 | Kiunkead | G01C 15/004 33/286 |
| 3,551,057 A | * | 12/1970 | Hamilton | G01B 11/16 250/203.1 |
| 3,599,336 A | * | 8/1971 | Walsh | G01C 15/002 248/168 |
| 3,723,013 A | * | 3/1973 | Stirland | G01B 11/26 250/204 |
| 4,447,962 A | * | 5/1984 | Grosberg | G01C 15/02 33/277 |
| 4,681,439 A | * | 7/1987 | Shoemaker | G01C 15/002 33/286 |
| 4,730,928 A | * | 3/1988 | Gabriel | G01B 3/002 356/400 |

(Continued)

FOREIGN PATENT DOCUMENTS

JP    2008-292210    12/2008

*Primary Examiner* — Shawn Decenzo
*Assistant Examiner* — Jarreas C Underwood
(74) *Attorney, Agent, or Firm* — Greenblum & Bernstein, P.L.C.

(57) ABSTRACT

A correction device for an optical measuring apparatus obtains correction data for each scanning position of a light beam from an optical measuring apparatus that includes a light beam scanner which scans with a light beam a measuring region where a measured object is placed, and a light receiver which receives a transmitted light beam from the measuring region. The correction device includes a translucent scale having scale marks arranged at a predetermined pitch, and a support to mount the scale in the measuring region so that an arrangement direction of the scale marks is a scanning direction of the light beam.

10 Claims, 4 Drawing Sheets

(56) References Cited

U.S. PATENT DOCUMENTS

| | | | | |
|---|---|---|---|---|
| 5,493,499 A | * | 2/1996 | Theurer | ................ E01B 35/00 |
| | | | | 342/357.34 |
| 5,500,525 A | * | 3/1996 | Saban | .................. G01S 17/026 |
| | | | | 250/206.1 |
| 5,751,408 A | * | 5/1998 | Ohtomo | ............... G01C 15/004 |
| | | | | 356/5.14 |
| 5,784,155 A | * | 7/1998 | Ohtomo | ............... G01C 15/004 |
| | | | | 356/141.1 |
| 6,705,020 B2 | * | 3/2004 | Keum | .................... H01L 21/68 |
| | | | | 33/502 |

* cited by examiner

CORRECTION DEVICE AND CORRECTION METHOD FOR OPTICAL MEASURING APPARATUS

CROSS-REFERENCE TO RELATED APPLICATIONS

The present application claims priority under 35 U.S.C. § 119 of Japanese Application No. 2014-068612, filed on Mar. 28, 2014, the disclosure of which is expressly incorporated by reference herein in its entirety.

BACKGROUND OF THE INVENTION

1. Field of the Invention

The present invention relates to a correction device and correction method for an optical measuring apparatus which measures a measured object by light beam scanning.

2. Description of Related Art

This type of optical measuring apparatus includes a light beam scanner and a light receiver having a scanning area of a light beam interposed there between. A measured object is placed in the scanning area, the scanning area is repeatedly scanned by a light beam emitted by the light beam scanner, and a transmitted light beam which passes through the scanning area is received by the light receiver. A diameter and the like of the measured object is measured by counting an amount of time that the light beam is blocked.

However, in the case of the optical measuring apparatus described above, it is difficult to scan the light beam from the light beam scanner accurately at a constant speed due to optical system errors and scan drive system errors, and the scan speed varies depending upon a measuring position. Thus, in order to obtain a more accurate measurement result, it is preferable to correct the measurement result using correction data that is determined for each position.

SUMMARY OF THE INVENTION

The present invention provides a correction device and correction method for an optical measuring apparatus that is capable of adequately correcting a measurement result and obtaining correction data in a short cycle time.

A correction device for an optical measuring apparatus according to an embodiment of the present invention obtains correction data for each scanning position of a light beam from an optical measuring apparatus that includes a light beam scanner which scans with a light beam a measuring area (measuring region) where a measured object is placed, and a light receiver which receives a transmitted light beam from the measuring area. The correction device includes a translucent scale having scale marks arranged at a predetermined pitch, and a support to mount the scale in the measuring area so that an arrangement direction of the scale marks is a scanning direction of the light beam.

A correction method for an optical measuring apparatus according to an embodiment of the present invention is a correction method for an optical measuring apparatus that includes a light beam scanner which scans with a light beam a measuring area where a measured object is placed, and a light receiver which receives a transmitted light beam from the measuring area. The correction method includes arranging a translucent scale having scale marks arranged at a predetermined pitch in the measuring area so that an arrangement direction of the scale marks is a scanning direction of the light beam; measuring a pitch of the scale marks with the optical measuring apparatus; and calculating correction data to correct a measurement result of the optical measuring apparatus based upon a difference between such measurement result and the predetermined pitch of the scales.

The present invention provides a correction device and correction method for an optical measuring apparatus that is capable of adequately correcting a measurement result error and obtaining correction data in a short cycle time.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

A correction device and correction method for an optical measuring apparatus according to an embodiment of the present invention are described below with reference to the drawings.

As a premise to describing the correction device and correction method for the optical measuring apparatus, a summary description of the optical measuring apparatus is provided first.

Figure 1:
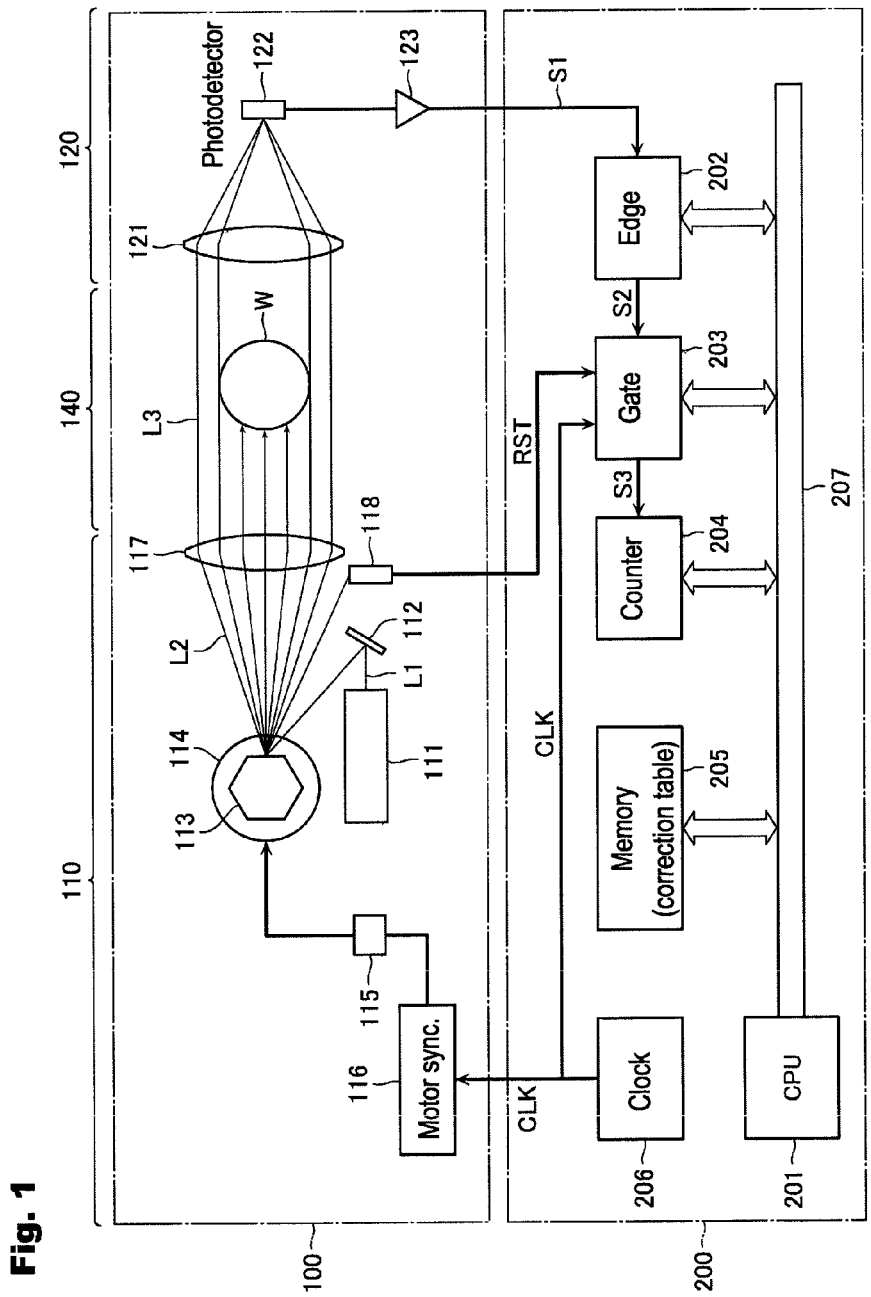
FIG. 1 is a functional block diagram of an optical measuring apparatus.
Figure 2:
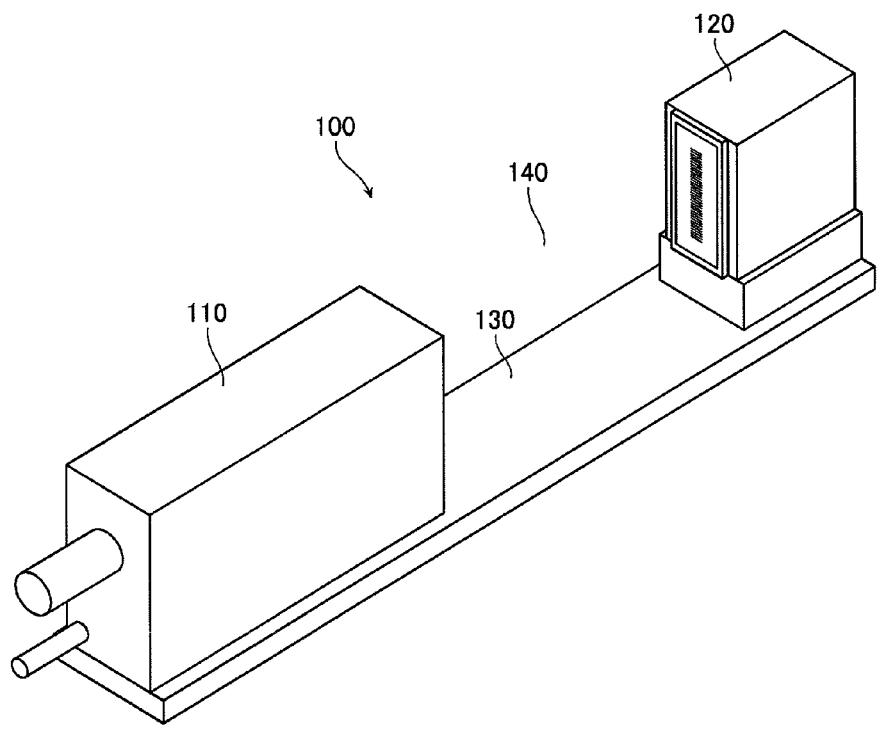
FIG. 2 is an external view of a measurer of the optical measuring apparatus.

FIG. 1 is an exemplary functional block diagram of an optical measuring apparatus. FIG. 2 is one example of an external view of a measurer of the optical measuring apparatus.

The optical measuring apparatus includes a measurer 100, and a controller 200 which calculates various dimensions of a measured object W using signals that are obtained from the measurer 100.

The measurer 100 includes a light beam scanner 110, a light receiver 120, and a connector 130. The light beam scanner 110 outputs a light beam which scans the measured object W. The light receiver 120 receives a transmitted light beam obtained from the light beam that is fired by the light beam scanner 110 and passes the measured object W. The connector 130 connects the light beam scanner 110 and the light receiver 120 at a predetermined interval. The area defined between the light beam scanner 110 and the light receiver 120 as fixed by the connector 130 is a measurement area 140, which includes a scanning area where the measured object W is placed and scanned.

The light beam scanner 110 of the measurer 100 has a laser light source 111, a mirror 112, a polygonal mirror 113, a motor 114, a motor drive circuit 115, a motor synchronous circuit 116, a collimator lens 117, and a reset photodetector 118. The light receiver 120 of the measurer 100 has a condenser lens 121, a measurement photodetector 122, and an amplifier 123.

The controller 200 has a CPU 201; an edge detection circuit 202; a gate circuit 203; a counter 204; a memory 205 such as a ROM, RAM, or the like; and a clock generation circuit 206 which outputs clock pulses CLK to the motor synchronous circuit 116 and gate circuit 203 of the measurer 100. The CPU 201 and the edge detection circuit 202, gate circuit 203, counter 204, memory 205, and clock generation circuit 206 are connected via a bus 207.

An operation principle of the optical measuring apparatus having the above configuration is as follows. The laser light source 111 of the measurer 100 outputs a laser beam L1. The outputted laser beam L1 reflects off of the mirror 112 and then strikes the polygonal mirror 113. The polygonal mirror 113 is rotationally driven by the motor 114, and this converts the laser beam L1 into a rotary scanning beam L2. At this point, the motor 114 is driven by a drive signal that is generated in the motor drive circuit 115 based upon a synchronization signal. The synchronization signal is generated in the motor synchronous circuit 116 based upon the clock pulses CLK. Next, the rotary scanning beam L2 is further converted into a parallel scanning beam L3 (light beam) having a constant speed and a narrowed beam diameter. The parallel scanning beam L3 is fired so as to scan the measurement area 140 (where the measured object W is placed) in conjunction with the rotation of the polygonal mirror 113; the parallel scanning beam L3 then passes through the condenser lens 121 and enters the measurement photodetector 122. An output (scan signal) of the measurement photodetector 122 is amplified by the amplifier 123, and then inputted to the edge detection circuit 202 of the controller 200.

A scan signal Si which is inputted to the edge detection circuit 202 of the controller 200 is formatted with a threshold value of 50%, for example, and then inputted to the gate circuit 203 as an edge detection signal S2. In the gate circuit 203, a gate signal S3 is generated by gating the clock pulses CLK based upon the inputted edge detection signal S2 and is then inputted to the counter 204. In the counter 204, the number of pulses of the inputted gate signal S3 is counted. In the CPU 201, a calculation process is executed using the pulse count and a measured value, being a diameter or the like of the measured object W, is calculated. Since the measurement area 140 is scanned repeatedly by the parallel scanning beam L3, the CPU 201 calculates a plurality of measured values; however, a final measurement result is obtained by taking the average of these measured values.

The reset photodetector 118 is provided outside the valid scan range of the rotary scanning beam L2 and detects a beginning or ending of one scan. A reset signal RST, being an output of the reset photodetector 118, is inputted to the gate circuit 203 of the controller 200 and is used as a timer to reset the gate circuit 203.

Figure 3:
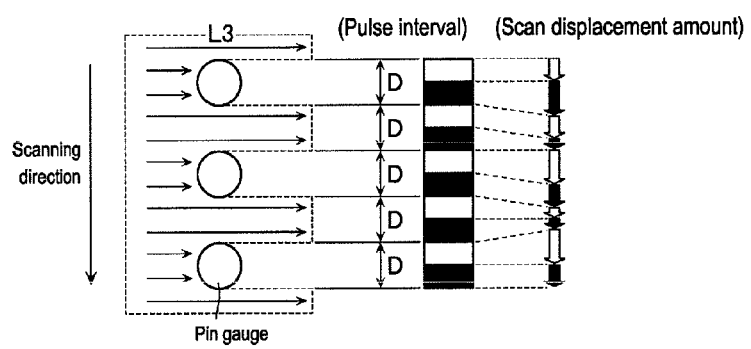
FIG. 3 illustrates factors which contribute to an occurrence of a measurement error in the optical measuring apparatus.

Next, factors which contribute to the occurrence of a measurement error in the optical measuring apparatus are described. FIG. 3 illustrates factors which contribute to the occurrence of a measurement error in the optical measuring apparatus. FIG. 3 illustrates measurement of pin gauges provided in the measurement area and spaced at an equal interval D in a scanning direction of the parallel scanning beam L3, and each pin gauge having an outer diameter equal to a length of the interval D.

In the case shown in FIG. 3, ideally, the optical measuring apparatus should obtain a measurement result of identical dimension for all of the pin gauges. This assumes that a scan displacement amount of the parallel scanning beam L3 is the same for each fixed pulse interval. However, in reality, a scan speed of the parallel scanning beam L3 becomes non-uniform due to optical system factors such as the mirror 112, polygonal mirror 113, or the collimator lens 117, and a non-uniform rotation speed of the motor 114. Thus, as shown in FIG. 3, the scan displacement amount of the parallel scanning beam L3 for each fixed pulse interval differs depending upon the position of the pin gauge, and thus a measurement error occurs. Therefore, in order to take measurements more accurately, it is preferable to correct the measurement result in accordance with the scanning position.

To address the circumstances above, a correction method according to a comparative example is described next as a premise to describing a correction method for an optical measuring apparatus according to an embodiment of the present invention.

Figure 4A:
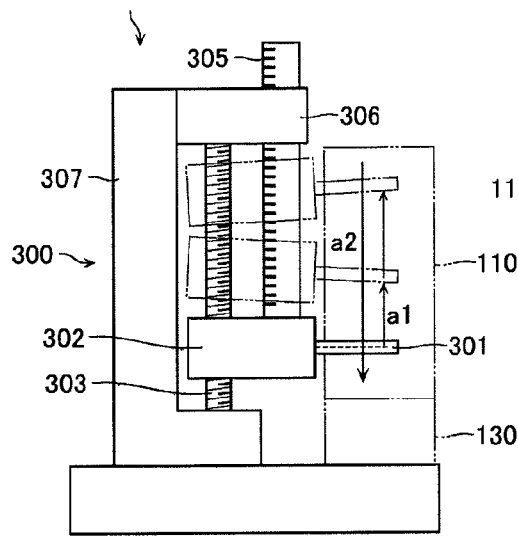
FIGS. 4A and 4B illustrate a correction method for an optical measuring apparatus according to a comparative example.
Figure 4B:
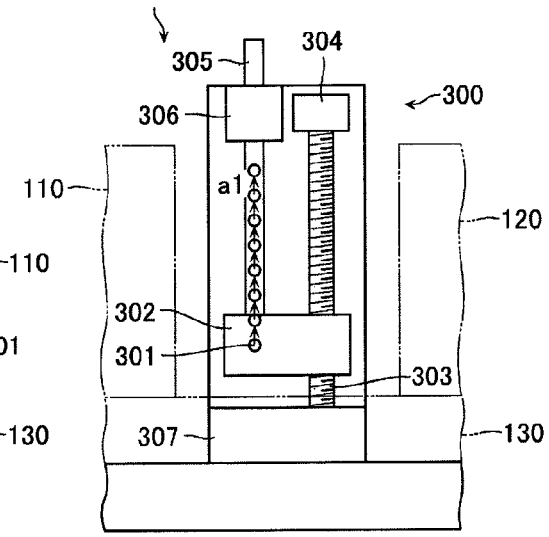

FIGS. 4A and 4B illustrate a correction method for an optical measuring apparatus according to a comparative example. FIGS. 4A and 4B show the optical measuring apparatus and a correction device 300 when correction data to correct a measurement result is obtained. FIG. 4A is a side view of the correction device 300 and FIG. 4B is a front view of the correction device 300.

The correction device 300 includes a pin gauge 301, a pin gauge fixating part 302 which fixates the pin gauge 301, a shaft 303 which rotates to move the pin gauge fixating part 302 vertically, a shaft driver 304 which rotates the shaft 303, a precision scale 305 which indicates a position (height) of the pin gauge 301 fixed to the pin gauge fixating part 302, a scale fixating part 306 which fixates an upper portion of the precision scale 305 so as to be movable, and a support 307 which supports the shaft driver 304 and scale fixating part 306.

In the correction method according to the comparative example, the correction data is calculated using the correction device 300 as follows. Specifically, a single pin gauge 301 is displaced by intermittent operation in the measurement area at sufficiently spaced out pitches (arrow a1 shown in FIG. 4A). When the pin gauge 301 stops, the position of the pin gauge 301 is read by the scale 305 and, at the same time, the position of the pin gauge 301 at this point is also measured by the optical measuring apparatus. Then, using the position read by the scale 305 as a true value, a difference between the true value and the position measured by the optical measuring apparatus is taken and correction data for the position is calculated. The optical measuring apparatus calculates the final measurement result by correcting the measurement result obtained from the actual measured object using the correction data.

However, the correction method according to the comparative example leads to the following situation. That is, in this correction method, the pin gauge 301 is displaced at a predetermined pitch in order to obtain the correction data. In such a case, as shown in FIG. 4A, a pitching movement causes a tilt (cosine error) and the like of the pin gauge 301. Thus, the position read by the scale 305 differs from the actual position of the pin gauge 301, and such difference leads to a measurement error. Further, while it is preferable to have a finer pitch in obtaining the correction data, this increases the displacement of the pin gauge 301 and the number of measuring cycles; thus, a cycle time to obtain the correction data becomes long.

To address the circumstances above, a correction method according to an embodiment of the present invention is described next.

Figure 5:
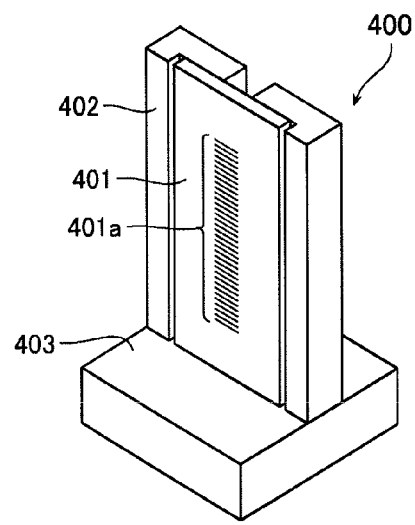
FIG. 5 is an external view of a correction device for an optical measuring apparatus according to an embodiment of the present invention.

First, a summary description of a correction device 400 used in the correction method according to the embodiment of the present invention is provided. FIG. 5 is an external view of the correction device for the optical measuring apparatus according to the embodiment of the present invention. The correction device 400 includes a translucent scale 401 having scale marks 401a arranged at a predetermined pitch, a scale fixating part 402 which fixates the scale 401, and a support 403 which supports the scale fixating part 402. The scale 401 is formed by a glass plate, for example, and the scale marks 401a are etched on a surface thereof by chrome vapor deposition, for example. By forming the scale 401 this way, it is possible to etch the scale marks 401a at a very precise fixed pitch, and thus the scale 401 can be used as a correction reference for the optical measuring apparatus.

Next, a correction method according to an embodiment of the present invention using the correction device 400 is described.

Figure 6:
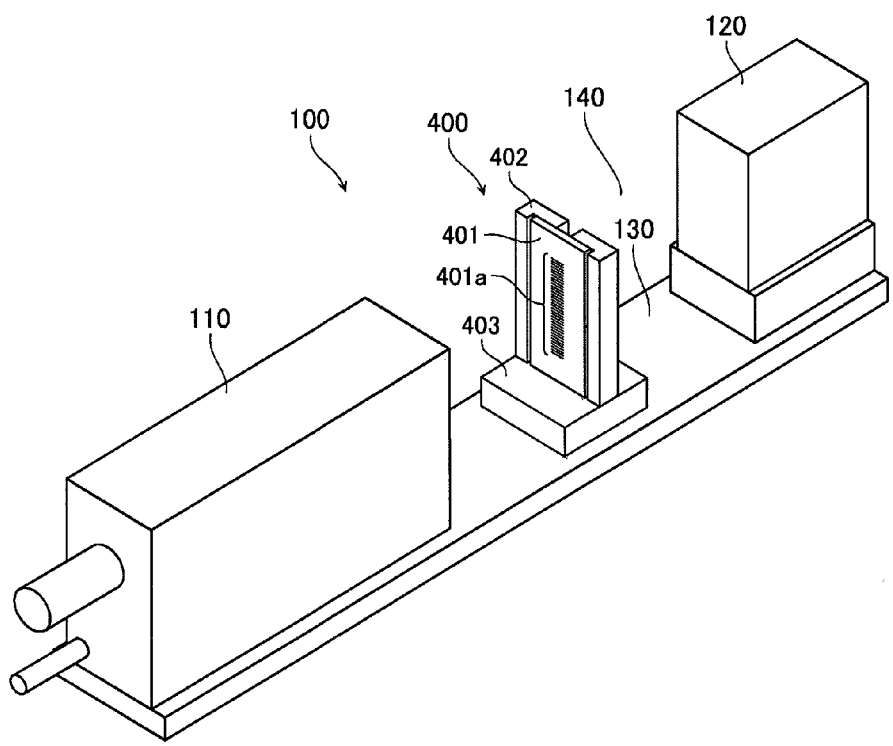
FIG. 6 illustrates a correction method for an optical measuring apparatus according to an embodiment of the present invention.

FIG. 6 illustrates the correction method according to the embodiment of the present invention. In the correction method according to the embodiment of the present invention, the correction device 400 is provided relative to the measurement area 140 so that an arrangement direction of the scale marks 401a is the scanning direction of the parallel scanning beam L3, and a pitch of the scale marks 401a is measured. Then, using the predetermined pitch of the scale marks 401a as a true value, a difference between the true value and the pitch measured by the optical measuring apparatus is taken and correction data for the position is calculated. The optical measuring apparatus calculates the final measurement result by correcting the measurement result using the correction data associated with the actual position of the measured object. Additionally, the correction data may be stored in table format in the memory 205 of the controller 200 of the optical measuring apparatus.

According to the correction method according to the embodiment of the present invention, by directly detecting the scale marks 401a arranged at a precise pitch using the precise glass-plate scale 401 as the correction reference of the optical measuring apparatus, it is possible to reduce errors which arise in a correction method where the displacement amount of the pin gauge 301 is used as the reference, such as in the comparative example. Additionally, in the embodiment, there is no need to move the scale 401, the scale 401 being the correction reference, and thus the cycle time may be significantly reduced compared to a correction method where the displacement amount of the pin gauge 301 is used as the reference, such as in the comparative example.

In other words, the embodiment provides a correction device and correction method for an optical measuring apparatus that is capable of more adequately correcting an error in a measurement result and obtaining correction data in a short cycle time.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A correction device for an optical measuring apparatus that includes a light beam scanner which scans with a light beam a measuring region where a measured object is placed, and a light receiver which receives a transmitted light beam from the measuring region, the correction device configured to obtain correction data for each scanning position of the light beam from the optical measuring apparatus, the correction device comprising:
   a translucent scale having scale marks arranged at a predetermined pitch;
   a pin gauge configured to indicate a measurement of a pitch of the scale marks;
   a scale configured to determine a measurement value indicated by the pin gauge; and
   a support configured to mount the scale in the measuring region such that an arrangement direction of the scale marks is a scanning direction of the light beam,
   wherein the correction device is disposed between the light beam scanner and the light receiver of the optical measuring apparatus.

2. A correction method for an optical measuring apparatus that includes a light beam scanner which scans with a light beam a measuring region where a measured object is placed, and a light receiver which receives a transmitted light beam from the measuring region, the correction method comprising:
   arranging a translucent scale having scale marks arranged at a predetermined pitch in the measuring region so that an arrangement direction of the scale marks is a scanning direction of the light beam;
   emitting, using the light beam scanner at a scanning position among a plurality of scanning positions, the light beam towards the measuring region where the measured object is placed;
   receiving, using the light receiver, at least a portion of the light beam emitted by the light beam scanner;
   measuring, using a pin gauge, a pitch of the scale marks based on the received light beam;
   determining a difference between a predetermined value of the pitch of the scale marks and measured value of the pitch of the scale marks; and calculating an error of the measured value and correction data to correct the measured value based on the determined difference,
wherein the translucent scale is disposed between the light beam scanner and the light receiver of the optical measuring apparatus.

3. The correction method for the optical measuring apparatus according to claim 2, wherein the calculating further comprises calculating correction data for each scanning position of the light beam.

4. The correction method for the optical measuring apparatus according to claim 2, further comprising storing the correction data in a table format by the optical measuring apparatus.

5. The correction method for the optical measuring apparatus according to claim 3, further comprising storing the correction data in a table format by the optical measuring apparatus.

6. The correction method for the optical measuring apparatus according to claim 2, wherein the measuring region is located between the light beam scanner and the light receiver.

7. The correction method for the optical measuring apparatus according to claim 2, wherein the receiving includes receiving a portion of the light beam emitted by the light beam scanner that is not blocked by a pin gauge located between the light beam scanner and the light receiver.

8. The correction method for the optical measuring apparatus according to claim 7, wherein the pin gauge is configured to move with respect to emission of the light beam.

9. The correction method for the optical measuring apparatus according to claim 2, wherein the at least a portion of the light beam emitted by the light beam scanner passes through the translucent scale.

10. An optical correction system, comprising:
an optical measuring apparatus including:
a light beam scanner which emits a light beam towards a measuring region where a measured object is placed, and
a light receiver which receives at least a portion of the light beam emitted by the light beam scanner; and
a correction device including:
a translucent scale having scale marks arranged at a predetermined pitch and disposed between the light beam scanner and the light receiver; and
a pin gauge configured to indicate a measure of a pitch of the scale marks, wherein
the light receiver measures a value of the pitch of the scale marks based on a movement of the pin gauge, and
the optical measuring apparatus further includes a central processing unit (CPU) configured to
determine a difference between an actual predetermined value of the pitch of the scale marks and measured value of the pitch of the scale marks, and
calculate an error of the measured value and correction data to correct the measured value based upon the determined difference.

* * * * *